(12) United States Patent
Mehew et al.

(10) Patent No.: US 10,146,760 B2
(45) Date of Patent: Dec. 4, 2018

(54) BIOMETRICALLY SECURED USER INPUT FOR FORMS

(71) Applicant: The Western Union Company, Englewood, CO (US)

(72) Inventors: Evans Mehew, Larkspur, CO (US); Scott Paintin, Littleton, CO (US); Dianna Lyons, Highlands Ranch, CO (US); Julene M. Robbins, Centennial, CO (US)

(73) Assignee: THE WESTERN UNION COMPANY, Englewood, CO (US)

( * ) Notice: Subject to any disclaimer, the term of this patent is extended or adjusted under 35 U.S.C. 154(b) by 0 days.

(21) Appl. No.: 14/831,647

(22) Filed: Aug. 20, 2015

(65) Prior Publication Data

US 2016/0048495 A1    Feb. 18, 2016

Related U.S. Application Data

(63) Continuation of application No. 12/821,625, filed on Jun. 23, 2010, now Pat. No. 9,141,955.

(51) Int. Cl.
*G06Q 40/00* (2012.01)
*G06F 17/24* (2006.01)
(Continued)

(52) U.S. Cl.
CPC ............ *G06F 17/243* (2013.01); *G06F 3/033* (2013.01); *G06F 3/03542* (2013.01);
(Continued)

(58) Field of Classification Search
CPC .... G06F 17/243; G06F 3/033; G06F 3/03542; G06F 3/03545; G06F 3/04883;
(Continued)

(56) References Cited

U.S. PATENT DOCUMENTS 5,103,486 A    4/1992  Grippi et al.
5,280,527 A    1/1994  Gullman et al.
(Continued)

OTHER PUBLICATIONS

Cao, X., & Balakrishnan, R. (2008). Interacting with dynamically defined information spaces using a handheld projector and a pen doi:http://dx.doi.org/10.1145/1166253.1166289 on Jul. 10, 2018 (Year: 2008).*

(Continued)

*Primary Examiner* — Kito R Robinson
(74) *Attorney, Agent, or Firm* — Kilpatrick Townsend & Stockton, LLP (57) ABSTRACT

Systems and methods for collecting biometrically secured financial form data from a user are described. A user input device may receive biometric data from the user. The user may be presented with a visual medium. The visual medium may contain a plurality of fields for information necessary to conduct a financial transaction. Handwriting data may be received from the user. At least a portion of the handwriting may represent information corresponding to the plurality of fields for information necessary to conduct the financial transaction. At least a portion of the information corresponding to the plurality of fields for information necessary to conduct the financial transaction may be transmitted from the user input device to a computer system.

18 Claims, 7 Drawing Sheets

(51) Int. Cl.
  *G06F 3/033* (2013.01)
  *G06F 3/0354* (2013.01)
  *G06K 9/00* (2006.01)
  *G06Q 20/40* (2012.01)
  *G10L 17/00* (2013.01)
  *G06F 3/0488* (2013.01)
  *G06F 17/21* (2006.01)
  *G06F 21/32* (2013.01)
  *G06F 3/01* (2006.01)

(52) U.S. Cl.
  CPC ...... *G06F 3/03545* (2013.01); *G06F 3/04883* (2013.01); *G06F 17/214* (2013.01); *G06F 17/242* (2013.01); *G06F 21/32* (2013.01); *G06K 9/00885* (2013.01); *G06Q 20/40* (2013.01); *G10L 17/00* (2013.01); *G06F 3/017* (2013.01)

(58) Field of Classification Search
  CPC ...... G06F 17/214; G06F 17/242; G06F 21/32; G06Q 20/40
  USPC .......................................................... 705/44
  See application file for complete search history.

(56) References Cited

U.S. PATENT DOCUMENTS

| | | | |
|---|---|---|---|
| 5,347,295 A * | 9/1994 | Agulnick | G06F 1/1626 345/156 |
| 5,774,602 A | 6/1998 | Taguchi et al. | |
| 6,154,879 A | 11/2000 | Pare et al. | |
| 6,307,956 B1 | 10/2001 | Black | |
| 6,594,376 B2 | 7/2003 | Hoffman et al. | |
| 6,686,910 B2 * | 2/2004 | O'Donnell, Jr. | G06F 3/03545 345/179 |
| 6,839,453 B1 | 1/2005 | McWilliam et al. | |
| 6,945,725 B2 * | 9/2005 | Cui | F21V 33/0048 345/183 |
| 7,279,646 B2 | 10/2007 | Xu | |
| 7,286,706 B2 * | 10/2007 | Blaimberger | G06F 1/1626 345/162 |
| D559,310 S * | 1/2008 | Tsui | D19/123 |
| 7,343,299 B2 | 3/2008 | Algazi | |
| 7,346,545 B2 | 3/2008 | Jones | |
| 7,663,608 B2 * | 2/2010 | Sui | G06F 3/03542 345/173 |
| 7,793,109 B2 | 9/2010 | Ortiz | |
| 8,079,079 B2 | 12/2011 | Zhang et al. | |
| 8,228,299 B1 * | 7/2012 | Maloney | G06Q 20/14 345/173 |
| D670,699 S * | 11/2012 | Sato | D14/411 |
| 8,392,216 B2 * | 3/2013 | Crockett | G06F 19/322 705/3 |
| 8,487,915 B1 * | 7/2013 | Birger | H04N 9/3173 178/18.01 |
| 8,884,876 B2 * | 11/2014 | Song | G06F 3/03542 345/158 |
| 9,001,028 B2 * | 4/2015 | Baker | H04N 9/3129 345/156 |
| 9,141,955 B2 | 9/2015 | Mehew et al. | |
| 9,680,976 B2 * | 6/2017 | Chen | H04M 1/05 |
| 2001/0033293 A1 * | 10/2001 | Hollstrom | B41J 2/315 715/705 |
| 2002/0001029 A1 * | 1/2002 | Abe | G01B 11/2509 348/49 |
| 2002/0083323 A1 * | 6/2002 | Cromer | H04N 1/32101 713/176 |
| 2002/0091937 A1 | 7/2002 | Ortiz | |
| 2002/0107885 A1 * | 8/2002 | Brooks | G06F 3/04883 715/224 |
| 2002/0125324 A1 * | 9/2002 | Yavid | C09D 163/00 235/462.45 |
| 2002/0170885 A1 | 11/2002 | Krenz | |
| 2002/0178369 A1 | 11/2002 | Black | |
| 2004/0008222 A1 * | 1/2004 | Hovatter | G06F 3/0481 715/749 |
| 2004/0247160 A1 * | 12/2004 | Blaimberger | G06F 1/1626 382/107 |
| 2005/0134927 A1 * | 6/2005 | Nomura | G06F 3/03545 358/3.28 |
| 2005/0135865 A1 * | 6/2005 | Cui | B43K 29/007 401/195 |
| 2005/0163377 A1 * | 7/2005 | Walch | G06K 9/00154 382/187 |
| 2005/0180808 A1 * | 8/2005 | Cui | F21V 33/0048 401/195 |
| 2005/0264525 A1 * | 12/2005 | Adams | G06F 3/0304 345/156 |
| 2005/0280628 A1 * | 12/2005 | Adams | H04N 5/74 345/156 |
| 2006/0036472 A1 * | 2/2006 | Crockett | G06F 19/322 705/3 |
| 2006/0109260 A1 * | 5/2006 | Sui | G06F 3/03542 345/175 |
| 2007/0139367 A1 * | 6/2007 | Goffin | G06K 9/228 345/156 |
| 2007/0176909 A1 * | 8/2007 | Pavlowski | G06F 3/03545 345/179 |
| 2007/0235532 A1 * | 10/2007 | Lapstun | G06F 3/014 235/383 |
| 2007/0286486 A1 * | 12/2007 | Goldstein | G06K 9/00422 382/187 |
| 2008/0115981 A1 * | 5/2008 | Bechtel | G06F 3/03545 178/19.01 |
| 2008/0148395 A1 * | 6/2008 | Brock | G06F 21/31 726/21 |
| 2008/0253659 A1 * | 10/2008 | Walch | G06K 9/00161 382/186 |
| 2009/0024707 A1 * | 1/2009 | Aase | G10L 13/00 709/206 |
| 2009/0076951 A1 * | 3/2009 | Szamel | G06Q 20/10 705/39 |
| 2009/0244644 A1 * | 10/2009 | Matsuyama | G06F 21/606 358/402 |
| 2010/0011280 A1 * | 1/2010 | Cheeniyil | G06F 17/243 715/223 |
| 2010/0283766 A1 | 11/2010 | Shieh | |
| 2011/0119638 A1 * | 5/2011 | Forutanpour | G06F 3/03542 715/863 |
| 2011/0179180 A1 * | 7/2011 | Schleifer | H04L 12/1818 709/227 |
| 2011/0231909 A1 * | 9/2011 | Shibuya | G06F 21/31 726/5 |
| 2011/0310066 A1 * | 12/2011 | Fermgard | B43K 8/00 345/179 |
| 2011/0316665 A1 | 12/2011 | Mehew et al. | |
| 2011/0320352 A1 | 12/2011 | Mehew et al. | |
| 2011/0320353 A1 | 12/2011 | Mehew et al. | |
| 2013/0262141 A1 * | 10/2013 | Crockett | G06F 19/322 705/3 |
| 2014/0028635 A1 * | 1/2014 | Krah | G06F 3/041 345/179 |
| 2014/0297528 A1 * | 10/2014 | Agrawal | G06Q 20/40145 705/44 |

OTHER PUBLICATIONS

Epson's innovative BrightLink 450Wi interactive projector now available for businesses. (Jun. 9, 2010). PR Newswire Retrieved from https://dialog.proquest.com/professional/docview/738117967?accountid=142257 on Jul. 10, 2018 (Year: 2010).*

Song, H., Grossman, T., Fitzmaurice, G., Guinnbretiere, F., Khan, A., Attar, R., & Kurtenbach, G. (2009). PenLight: Combining a mobile projector and a digital pen for dynamic visual overlay doi:http://dx.doi.org/10.1145/1518701.1518726 on Jul. 10, 2018 (Year: 2009).*

"M-tech: Plaudits & predictions", New Zealand Management, vol. 49, No. 11, Dec. 2002, pp. 113-119.

(56) References Cited

OTHER PUBLICATIONS

U.S. Appl. No. 12/821,625, "Notice of Allowance", dated May 15, 2015, 11 pages.
U.S. Appl. No. 12/821,625, "Office Action", dated Mar. 23, 2012, 14.
U.S. Appl. No. 12/821,625, "Office Action", dated Aug. 9, 2012, 17.
U.S. Appl. No. 12/821,655, "Final Office Action", dated Aug. 12, 2016, 24 pages.
U.S. Appl. No. 12/821,655, "Non Final Office Action", dated May 30, 2014, 20 pages.
U.S. Appl. No. 12/821,655, "Non-Final Office Action", dated Jan. 26, 2015, 25 pages.
U.S. Appl. No. 12/821,655, "Office Action", dated Nov. 22, 2011, 15 pages.
U.S. Appl. No. 12/821,655, "Office Action", dated Apr. 6, 2012, 18 pages.
U.S. Appl. No. 12/821,655, "Office Action", dated Sep. 12, 2012, 19 pages.

\* cited by examiner

BIOMETRICALLY SECURED USER INPUT FOR FORMS

CROSS-REFERENCES TO RELATED APPLICATIONS

This application is a continuation of U.S. patent application Ser. No. 12/821,625, filed Jun. 23, 2010, issued on Sep. 22, 2015 as U.S. Pat. No. 9,141,955, and entitled "Biometrically Secured User Input For Forms," the entire disclosure of which is hereby incorporated by reference, for all purposes, as if fully set forth herein.

This application is also related to co-pending U.S. patent application Ser. No. 12/821,681, filed Jun. 23, 2010, and entitled "Personal Writing Device with User Recognition Capabilities and Personal Information Storage," and Ser. No. 12/821,655, filed Jun. 23, 2010, and entitled "Multi-User Device with Information Capture Capabilities." Each of these applications are also hereby incorporated by reference, for all purposes, as if fully set forth herein.

BACKGROUND OF THE INVENTION

People are requested to complete forms for various reasons. For example, a patient may use a form to provide a doctor with the patient's medical history. As another example, a person may need to complete a form to conduct a money transfer transaction using a money transfer service provider, such as WESTERN UNION. Also, in many instances, a job application may include a standard form that must be filled out with the applicant's biographical information. Of course, many other forms are possible.

The use of forms to collect data may present several problems. First, it may not be possible to accurately determine if the person providing the information on the form is who the person has identified himself to be. One solution may be to have someone else manually verify an identification card (such as a government-issued driver's license) of the person completing the form. However, this may require someone to manually inspect the identification card. Also, a manual inspection of an identification card may result in human error. A person posing as someone else may be a significant problem in a situation where a criminal act is being furthered using the form, such as a transfer of money to fund terrorist activities or complete illegal drug sales.

Another problem possibly created by collecting information using forms is that the information handwritten on the form may need to be transcribed into a computer system to be electronically readable. For example, a doctor may want the medical history provided by a patient to be loaded to a database. If the patient provides his medical history on a form, someone may need to manually transcribe the information into a database using a computer. Such a process may be time consuming and, thus, costly. Such a manual transcription may also result in errors being introduced to the person's medical history.

Further, it may be impractical for a person to personally type his or her information directly into an electronic form via a computer (or any other computerized device, such as an tablet computer, netbook, laptop, smartphone, etc.) with a standard input device, such as a keyboard. For example, a particular form may need to be filled out by dozens of people in a short span of time. Having multiple computers available to allow people to simultaneously complete the form may be impractical.

The invention described herein addresses these and other problems.

BRIEF SUMMARY OF THE INVENTION

A biometrically secured user input device, possibly in the form of a writing implement, such as a pen, may serve to solve these problems. Such a user input device may contain a biometric authentication device capable of collecting information sufficient to identify the user completing the form, such a voiceprint, fingerprint, and/or a retina scan. The user input device may also be able to capture the user's handwriting. Therefore, as the user writes, the user input device may be able to identify the user and/or may electronically capture handwriting data for transmission to a computer system. The person may be writing on a visual medium such as a printed paper form. The user input device may have ink, allowing the person to complete the paper form conventionally. This paper form may then be available for the user to keep as a record of the information he supplied via the handwriting data collected by the user input device. Alternatively, the visual medium may be an electronic representation of a form. The user input device may not have any ink, allowing the person to write with the user input device on the surface of the visual medium without leaving a physical mark on the visual medium. The user input device may communicate (e.g., RFID or some other form of near field communication) to the visual medium all or a portion of the information required to complete the form. All or a portion of the information may be stored in the user input device. An electronic visual medium may have the ability to display multiple different forms.

Such collection of form data electronically may be used to complete any type of form, including a form for a financial transaction, such as a money transfer transaction. A person who wishes to complete a money transfer may provide a biometric identifier with a user input device. The person may then complete a form necessary to conduct the money transfer transaction using the user input device. The form may be a paper form or an electronically displayed form. After completing the form, the person may provide funds to an agent of the money transfer service provider (possibly in the form of cash, check, money order, etc.) or may provide funds electronically from a credit card account, debit card account, e-check, savings account, mobile wallet (which may be associated with the user input device), etc. If a paper form was completed by the person, he may be allowed to take the form with him because all of the necessary information to conduct the transfer has been electronically captured by the user input device and transferred to the computer system. The paper form may serve as a receipt or proof transaction for the person.

In some embodiments, a method for collecting biometrically secured financial form data from a user is described. The method may include receiving, by a user input device, biometric data from the user. The method may include presenting the user with a visual medium. The visual medium may contain a plurality of fields for information necessary to conduct a financial transaction. The method may include receiving, by the user input device, handwriting data from the user. At least a portion of the handwriting may represent information corresponding to the plurality of fields for information necessary to conduct the financial transaction. The method may include transmitting, by the user input device, to a computer system, at least a portion of the information corresponding to the plurality of fields for information necessary to conduct the financial transaction.

In some embodiments, a system for conducting a biometrically secured financial transaction based on handwritten information supplied by a user is described. The system may include a user input device, wherein the user input device comprises a biometric authentication device and a handwriting input sensor. The system may also include a visual medium. The visual medium may display fields for the user to provide information linked to the financial transaction. The system may include a host computer system. The host computer system may be configured to initiate a financial transaction at least partially based on biometric authentication information received by the biometric authentication device of the user input device and handwriting received from the user by the handwriting sensor of the user input device.

In some embodiments, a method of collecting biometrically secured financial transaction information from a user is described. The method may include providing the user with a plurality of different financial transactions to select from. The method may include receiving, by a computer system, a selection of a financial transaction from the user. The method may include presenting, by a visual medium, a form for collecting information relevant to the financial transaction the user selected. The form may comprise various data fields. The method may include receiving, by a user input device, biometric authentication information from the user. The method may include receiving, by the user input device, handwriting information from the user. The handwriting information may comprise information necessary to initiate the selected financial transaction and corresponds to the various data fields of the form. The method may include transmitting, by the user input device, at least a portion of the handwriting information to the computer system.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components.

DETAILED DESCRIPTION OF THE INVENTION

A biometrically secured user input device may be used to authenticate a user and electronically store and/or capture form data. Such a biometrically secured user input device may capture biometric information from a user, such as a handwriting sample, fingerprint, voiceprint, and/or retina scan. This biometric information may be used to authenticate the user's identity. The user input device may also be used by the user to complete a form. The form may be printed on paper (or some other physical writing medium) or may be electronically displayed on a screen, such as an LCD display. If the form is printed on paper, the user may physically complete the form using ink supplied by the user input device. The user input device may be held by the user similarly to a typical writing instrument, such as a pen. While the user is handwriting responses to complete the form, the user input device may have a handwriting sensor that electronically captures the user's handwriting. Handwriting data captured by the handwriting sensor may be transferred to a computer system. The user may be allowed to keep the handwritten form as a record of the user's information supplied on the form.

Alternatively, the user may be presented with an electronic form displayed on a screen. In such embodiments, the user may not write on the screen using ink, but instead may trace the pen over the screen as if handwriting responses on the form. As the user writes, the user's handwriting may or may not electronically appear on the screen. As with the paper form, handwriting data may be captured by the handwriting sensor on the user input device. This handwriting data may be transmitted to a computer system. Alternatively, or in addition, the user input device may capture information via a keyboard or keypad (e.g., computer connected to a user input device, mobile phone, PDA, etc.).

After reception by the computer system, such handwriting data may be analyzed and converted to digital text. Some or all of the handwriting data may be preserved in the form of the user's handwriting (such as a signature) as proof of agreeing to the form (e.g., the form may be a contract), completing the form, or to serve as a biometric sample of the user. For example, the user's signature may be compared to a previously stored or a future signature to authenticate the user's identity.

Figure 1:
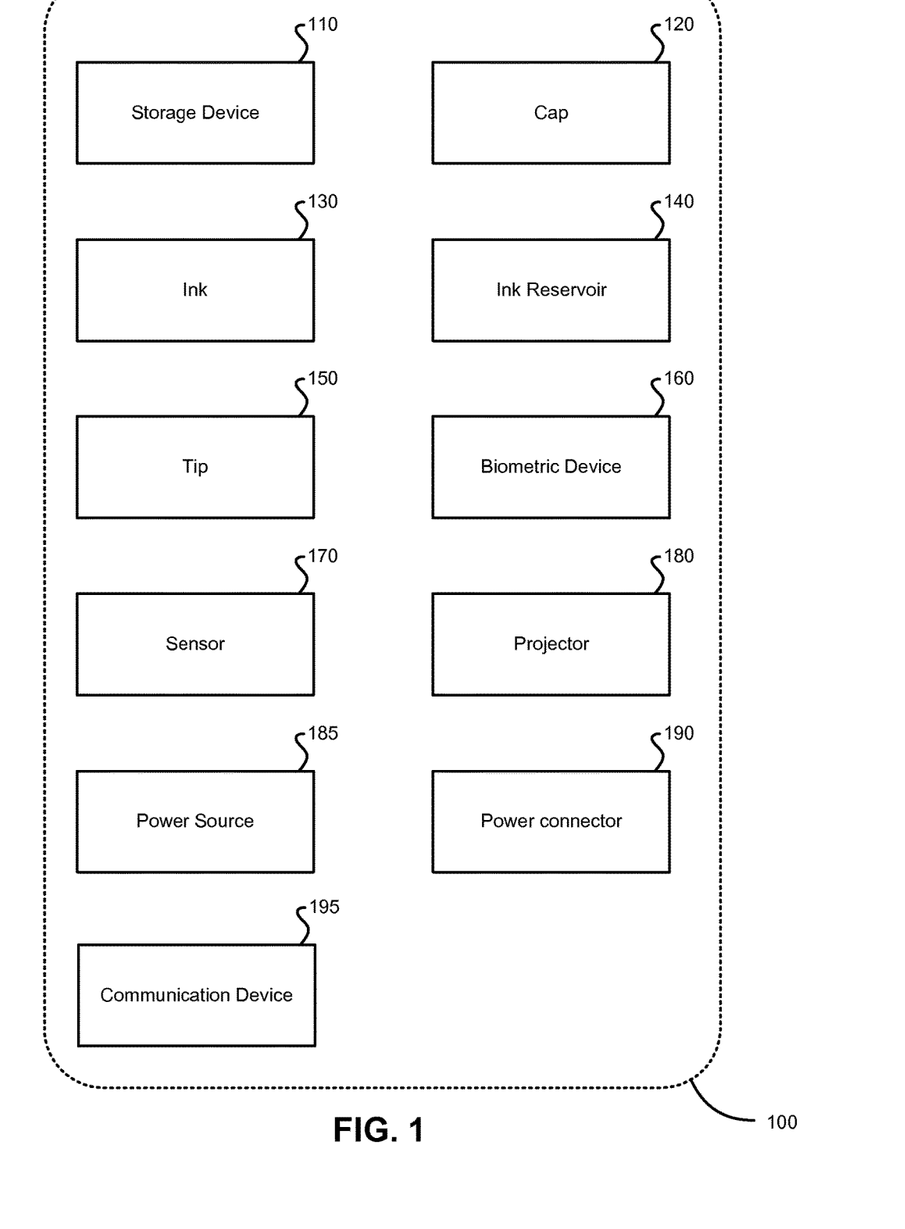
FIG. 1 illustrates a simplified block diagram of subsystems in a user input device.

Such a biometrically secured user input device, also referred to as a user input device for simplicity, may have several subsystems. FIG. 1 illustrates a simplified block diagram of various subsystems which may be present in user input device 100. The user input device may have one or more of: a storage device 110, a cap 120, ink 130, an ink reservoir 140, a tip 150, a biometric authentication device 160, a sensor 170, a projector 180, a power source 185, a power connector 190, and/or a communication device 195. The user input device may also have a keypad or touch screen.

The user input device may have a storage device 110. The storage device may be configured to store previously collected biometric data for one or more users. This biometric data may be stored as biometric profiles for multiple users. Allowing biometric data to be stored for multiple persons at the user input device may allow multiple users to make use of the user input device, rather than the user input device being associated with only one person. The storage device 110 may also store data linked to a particular user. In some embodiments, the storage device 110 stores financial information of the user, such as account numbers of credit card accounts, debit card accounts, stored value card accounts, etc. Some or all of the data stored on storage device 110 may be encrypted.

The user input device 100 may have a cap 120. Cap 120 may be a removable cover that may be used to cover tip 150. User input device 100 may also have ink 130 and ink reservoir 140. Ink 130 may be stored in reservoir 140. Ink reservoir 140 may be located within the user input device 100. User input device 100 may also have a tip 150. Tip 150 may be used to transfer ink 130 from the ink reservoir 140 to a writing medium, such as paper and/or a whiteboard. Tip 150 may be a ball-point. Tip 150 may be retractable into the body of the user input device. Ink reservoir 140 may be refillable. In some embodiments, ink 130 and ink reservoir 140 are not present; however tip 150 is present. This configuration allows user input device 100 to be moved across a surface, such as paper, a white board, a computer display, or any other surface without leaving any markings.

To be clear, ink 130 of user input device 100 may be used to write on any surface, including printed forms. The term printed forms is intended to be interpreted broadly, referring to any form containing text/writing and one or more fields for completion by a user. If user input device 100 is used to capture handwriting data while the user "writes" on a screen displaying an electronic version of a form, tip 150 may be retracted within user input device 100 extended (either permanently or temporarily) or otherwise unavailable. Alternatively, in such an instance, a user input device may not contain ink 130 and/or tip 150.

User input device 100 also has a biometric authentication device 160. Biometric authentication device 160 may allow for biometric information to be collected from a user. Biometric authentication device 160 may be a fingerprint scanner, a voiceprint recorder, a handwriting analyzer, a retina scanner, or any other biometric device capable of identifying a user. If biometric authentication device 160 is a fingerprint scanner, the user may place or swipe one or more fingers or thumb over the fingerprint scanner to input his fingerprint. If biometric authentication device 160 is a voiceprint recorder, the user may be asked to speak his name or a series of words so that the user's voice may be recorded and analyzed. If biometric authentication device 160 is a handwriting analyzer, the user may be prompted to sign his name or write a number, word, symbol or sentence. The handwriting analyzer may then use the peculiarities of the user's handwriting to authenticate his identity. If biometric authentication device 160 is a retina scanner, the user may be prompted to hold the retina scanner to his eye, allowing the scanner to image the user's retina. Each of these various forms of biometric authentication device 160 may allow for one or more biometric samples to be collected from the user. Each of these collected biometric samples may be compared to one or more previously collected (and/or future collected) biometric samples and/or otherwise analyzed to determine if the user's identity is authentic. The determination of whether a user's identity is authentic may involve statistical analysis of one or more biometric samples against one or more stored biometric samples and may be based on (one or more) confidence levels that collected biometric samples(s) match stored biometric sample(s).

The user input device 100 may have a handwriting sensor 170. Handwriting sensor 170 may be a camera that captures images of ink transferred to a writing medium and/or captures images of tip 150 moving on a writing medium or other surface. Handwriting sensor 170 may measure the speed of movement of user input device 100. Handwriting sensor 170 may measure the spatial movement of user input device 100 to determine what the user is writing. Handwriting data captured by the handwriting sensor 170 may be stored at storage device 110 and/or may be transferred to another device, such as a computer system.

If a camera is used for the sensor, it may be possible to use the camera for other purposes. For example, the camera may be used to image the user (e.g., to compare to a previously taken picture of the user for authentication), or to image goods or services (e.g., via a barcode) that the user wishes to purchase. Such a camera might be used to image barcodes or other product codes displayed on a billboard, magazine, catalog, mailing, etc. The user may also be able to image a barcode or other code on a bill.

User input device 100 may also have a projector 180. Projector 180 may be attached to the body of the user input device 100 or may be attached to cap 120. Projector 180 may allow for an image to be projected on to a surface (or in holographic form). The image projected by projector 180 may be an image of a form. Therefore, projector 180 may project an image of a form onto a surface with user input device 100 being able to maneuver over the image projected onto the surface, giving the user the impression of "writing" on the "form." The image of the form may be stored in the storage device 110 or may be transmitted to the user input device (e.g., near field communication, a wireless network, etc.).

An on-board power source 185 and power connector 190 may also be present on user input device 100. On-board power source 180 may be one or more batteries. The batteries may be rechargeable. Power connector 190 may serve to allow user input device 100 to be connected to another power source for recharging of on-board power source 185. In some embodiments, user input device 100 is always connected to some other power source via power connector 190.

User input device 100 may also have a communication device 195. Communication device 195 may allow user input device 100 to communicate with other devices, such as a computer system. Communication device 195 may allow for either wired or wireless communication with other devices, such as via BLUETOOTH, Wi-Fi, USB, CDMA, TDMA, GSM, etc. protocols. Communication device 195 may allow for biometric data of the user to be transmitted to another device. After the user's identity has been authenticated, communication device 195 may allow for data stored on storage device 110, such as financial account numbers, to be transmitted to and/or received from another device.

Figure 2:
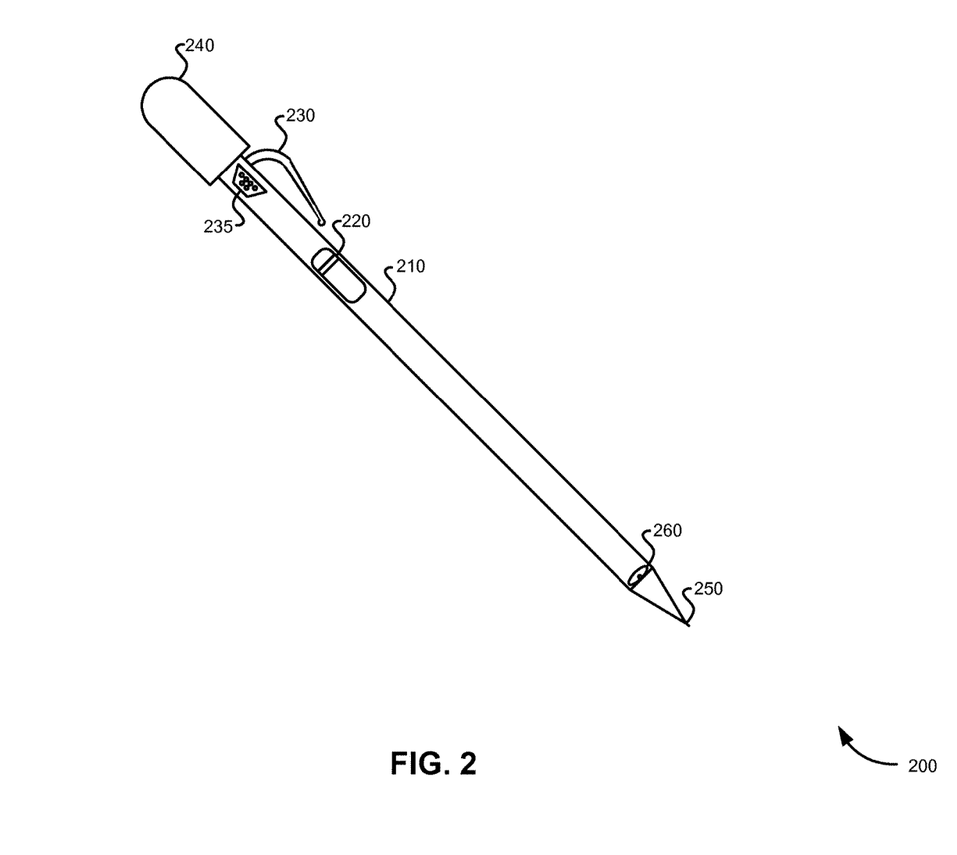
FIG. 2 illustrates a simplified embodiment of a user input device.

The user input device 100, may be in the form of a writing instrument. FIG. 2 illustrates a simplified embodiment of such a user input device 200. User input device 200 may represent user input device 100 of FIG. 1, or may represent some other user input device (e.g., mobile phone, smart phone, PDA, credit card, debit card, prepaid card, smart card, loyalty card, etc.) A user input device 200 in the form of a writing implement may consist of a case 210, a biometric authentication device 220, a clip 230, an external communication connector 235, a cap 240, a tip 250, and/or a sensor 260. Not illustrated, a power supply may be housed within the pen. Also, an ink reservoir, not pictured, may be housed within in the case of the user input device to store ink (also not pictured) to be used for writing. The user input device may have a case 210. The case may be plastic, metal, wood, carbon fiber, or any other suitable material for serving as the structure for a user input device in the form of a writing instrument.

A biometric authentication device 220 may be attached to case 210. Biometric authentication device 220 may be present anywhere on or in the user input device 200. Biometric authentication device 220 may be biometric authentication device 160 of FIG. 1, or may represent some other biometric authentication device.

A clip 230 may be present. A clip 230 may allow the user to attach the user input device 200 to any number of items, such as a pad of paper or shirt pocket, for safe keeping.

Connector 235 may serve as a power connector and/or a data transfer connector. For example, connector 235 may serve as the power connector and the communication device, such as the power connector and the communication device of FIG. 1. In some embodiments, the power connector and the communication device are separate, such as in embodiments where the communication device communicates with other devices wirelessly.

Cap 240 may represent cap 120 of FIG. 1, or may represent some other cap. Cap 240 may house a projector, such as projector 180 of FIG. 1. Cap 240 may be detachable from the non-writing end of the user input device 200, and detachable to the writing end to cover tip 250 and/or sensor 260.

Also attached to case 110 of user input device 200 and/or embedded in user input device 200 may be handwriting sensor 260. Handwriting sensor 260 may be the same handwriting sensor as sensor 170 of FIG. 1, or may represent some other handwriting sensor.

Ink and an ink reservoir, such as ink 130 and ink reservoir at 140 of FIG. 1, may be within case 210. Tip 250 may allow a user to write using user input device 200 and transfer ink to a writing medium, such as paper, via tip 250.

Figure 3:
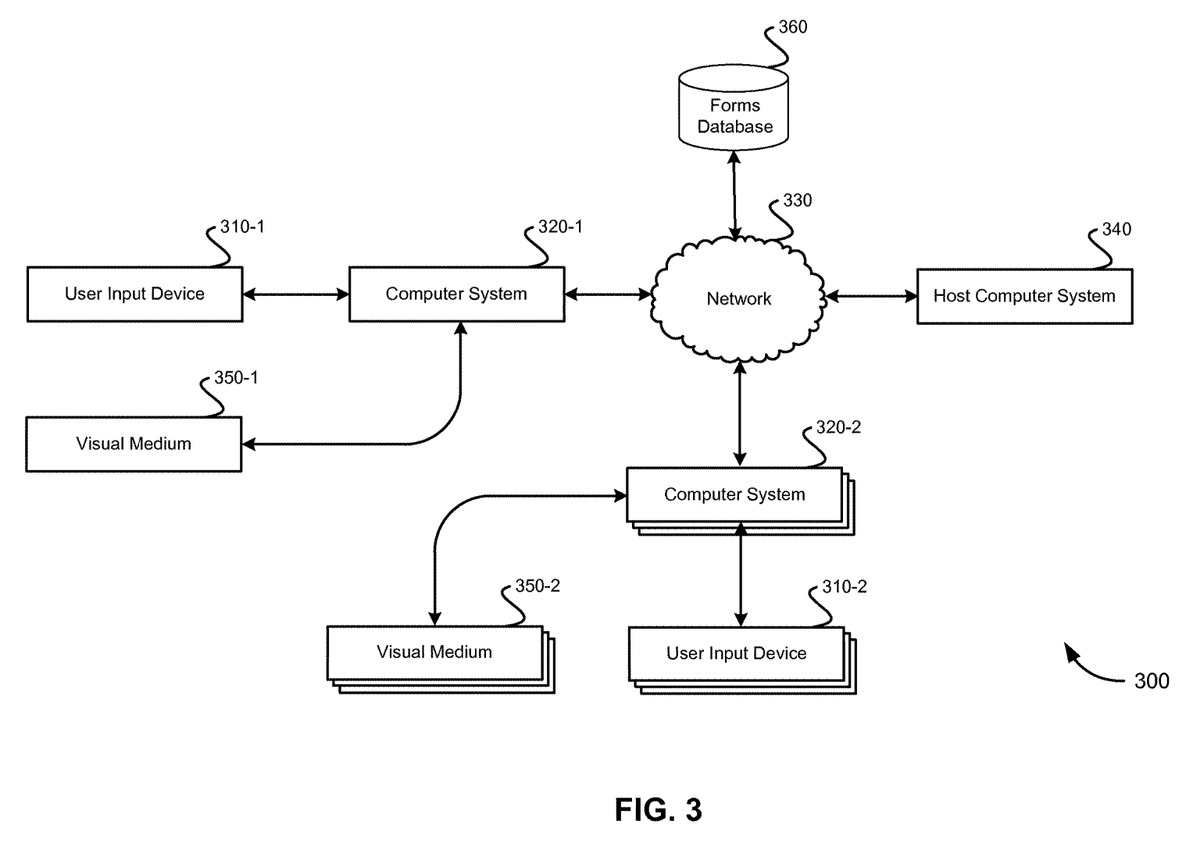
FIG. 3 illustrates a simplified embodiment of a system utilizing a user input device.

User input device 200 may be used in a system such as system 300 of FIG. 3. User input device 310-1 of FIG. 3 may represent user input device 200 of FIG. 2, user input device 100 of FIG. 1, or some other embodiment of a user input device. User input device 310-1 may communicate with a computer system 320-1. Computer system 320-1 may be located near user input device 310-1 with a near field communication protocol, such as BLUETOOTH, used for wireless communication. Other wireless communication protocols may be possible, such as 802.11a/b/g, GSM, CDMA, TDMA, satellite, etc. Alternatively, a wire may be used to connect user input device 310-1 to computer system 320-1 for communication.

Similarly, computer system 320-1 may communicate with visual medium 350-1. Such communication may occur if visual medium is an electronic display that is used to present various forms to a user. Visual medium 350-1 may be a LCD screen, a screen utilizing E-INK, or any other display technology. Visual medium 350-1 may store various forms using a computer-readable storage medium. Visual medium 350-1 may receive an indication from computer system 320-1 and/or from user input device of what form should be displayed. In some embodiments, a form that is to be displayed is transmitted from computer system 320-1 to visual medium 350-1. The connection between visual medium 350-1 and computer system 320-1 may be wired or wireless, using a near-field communication protocol, such as BLUETOOTH, or a protocol such as 802.11a/b/g, GSM, CDMA, TDMA, satellite, etc. In some embodiments, the visual medium is a printed form. In such embodiments, the computer system 320-1 may not communicate with visual medium 350-1.

Computer system 320-1 may represent any form of computer system. For example, computer system 320-1 may be a desktop, laptop, netbook, tablet computer, mainframe, server, kiosk, or smartphone. Computer system 320-1 may be a computer maintained by an entity, such as a money transfer service provider, to allow users to complete forms, or maintained by a third party. In some embodiments, the computer system may be a personal computer, such as a home computer. Whatever form computer system 320-1 takes, it may communicate with network 330. Network 330 may be one network or a conglomeration of several networks. For example network 330 may be, or include, the Internet, a corporate intranet, and/or a cellular service provider's wireless network to name only a few examples.

The computer system 320-1 may be able to access a forms database 360 via network 330. In some embodiments, forms database 360 is local to computer system 320-1 or host computer system 340. Forms database 360 may store various different forms that may be accessed by computer system 320-1 and displayed on visual medium 350-1. Once displayed on visual medium 350-1, user input device 310-1 may be used by a user to fill out the form. This may involve the user providing information to complete various questions on the form. The user may also provide a signature. As user input device 310-1 is used to complete the form, if the visual medium 350-1 is electronic, the user's responses may be displayed by the visual medium 350-1. To do this, user input device 310-1 may transmit the user's handwriting to computer system 320-1, which in turn transmits it to visual medium 350-1.

Computer system 320-1 may also communicate with host computer system 340 via network 330. Host computer system 340 may represent an entity to which form data is transmitted after being collected by the user input device 310-1. Depending on the form being completed, the information provided by the user may be transmitted to a different host computer system 340. For example, if the user is completing a form for a money transfer, the information collected by the user input device 310-1 from the user may be transmitted to a host computer system linked to a money transfer service provider. But, if the same user input device is used to complete a mortgage application, the information may be transmitted to a host computer system linked to a mortgage provider. For simplicity, only one host computer system 340 is illustrated in FIG. 3.

Handwriting data supplied by the user at user input device 310-1 may be converted from handwriting data to computer-editable text at the user input device 310-1, computer system 320-1, or host computer system 340. In some embodiments, some or all of the handwriting data supplied by the user is maintained in its original form. For example, a signature supplied by the user may be maintained as handwriting and/or writing strokes (possibly to serve as a biometric sample) and not converted to computer-editable text.

Figure 4A:
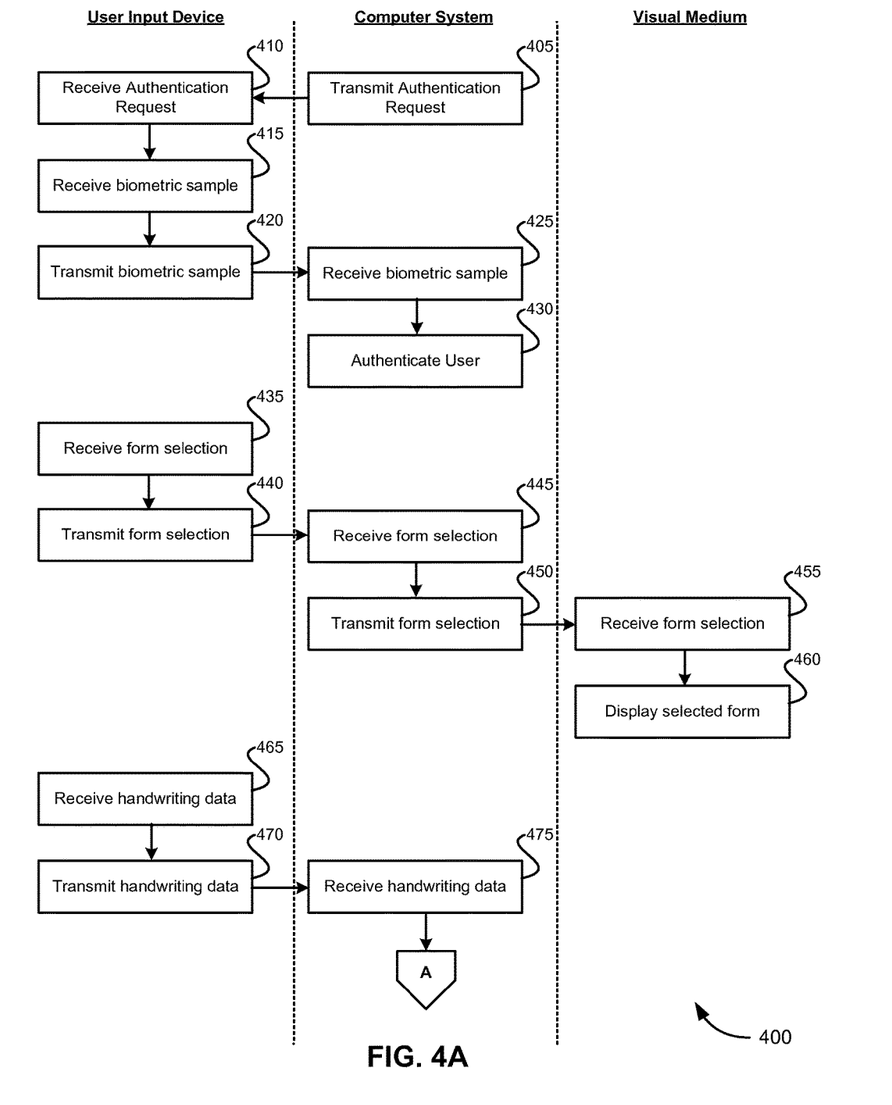
FIGS. 4A and 4B illustrate a simplified embodiment of a method for biometrically authenticating a user and gathering handwriting data linked to a form from the user.

System 300 of FIG. 3 may be used to implement various methods of collecting a user's completed response to a form. Method 400 is an embodiment of a simplified method that may use a system, such as system 300, to collect a user's responses to a form. In some embodiments, prior to collecting a user's handwritten responses, the user's identity is authenticated (e.g., ID checked, answers to questions checked against reliable sources, biometric samples(s), etc.). At block 405, an authentication request may be transmitted from a computer system, such as computer system 320-1 of FIG. 3, to a user input device, such as user input device 310-1 of FIG. 3.

Also, host computer system may interact with any number of other computer systems, user input devices, and visual mediums. For simplicity, only one additional group of a computer system 320-2, a user input device 310-2 and a visual medium 350-2 is depicted. Computer system 320-2 may function similarly to computer system 320-1. User input device 310-2 and visual medium 350-2 may be similar to user input device 310-2 and visual medium 350-2.

At block 410, the authentication request may be received at the user input device. The user input device may then request the user provide a biometric sample. In some embodiments, the user is informed of the need to provide the biometric sample by the user input device, the computer system, and/or the visual medium. For example, the visual medium may display a message saying "Please Provide Fingerprint to Pen." Of course, the form of biometric sample requested of the user would match what is to be collected. At block 415, the biometric sample may be received by the user input device. The biometric sample may be any appropriate form(s) of biometric sample(s), including a fingerprint, a voiceprint, a retina scan, and/or a signature. In some embodiments, multiple biometric samples are collected from the user. In some embodiments, the biometric sample is analyzed at the user input device to determine if the user has been authenticated. This may involve comparing the biometric sample to another previously collected biometric sample. In some embodiments, at block 420, the biometric sample is transmitted from the user input device to the computer system.

At block 425, the biometric sample may be received by the computer system. The biometric sample may be analyzed and/or stored at the computer system. (In some embodiments, the biometric sample is not analyzed at the computer system and is instead transmitted to a host computer system for authentication and/or storage.) At block 430, the user may be authenticated. This may involve the provided biometric sample being compared to a previously stored biometric sample. The comparison may involve appropriate statistical technique(s) (e.g., confidence level(s)). If the user's identity is not authenticated, the user may not be allowed to provide responses to the form, or a manual and/or other alternative authentication may need to be performed before allowing the user to continue. The computer system may provide an indication to the user that his identity has been successfully (or unsuccessfully) authenticated. After the user's identity has been authenticated, the user may be permitted to select a form and provide responses to the form. Alternatively, the use may complete all or a portion of the form before his identity is authenticated. In some embodiments, the biometric sample received by the computer system is linked to the handwriting data received at block 475. In such embodiments, the biometric data may not be authenticated unless at some point in the future there is a question as to the authenticity of the user's identity.

At block 435, the user input device and/or visual medium may be used to select a form. Alternatively, the user may select the form using the computer system. If the form is a paper form, the user may physically acquire the form and touch the user input device to a certain region of the form, thereby alerting the user input device of which form the user has selected. In some embodiments, form selection may be unnecessary. This may be because only one form is available to the user. Returning to the example of a money transfer service provider, only one form to complete a money transfer transaction may be present. Alternatively, a selection of a money transfer form may need to be made, for example, depending on whether the money transfer transaction is domestic or international or a bill payment. At block 440, if necessary, the selection of the form may be transmitted from the user input device to the computer system. In some embodiments, there may be no form for the user to complete, in which case, information from the user input device may be sent directly to the computer system and/or host computer system (e.g., direct connection, near-field communication, etc.).

Figure 4B:
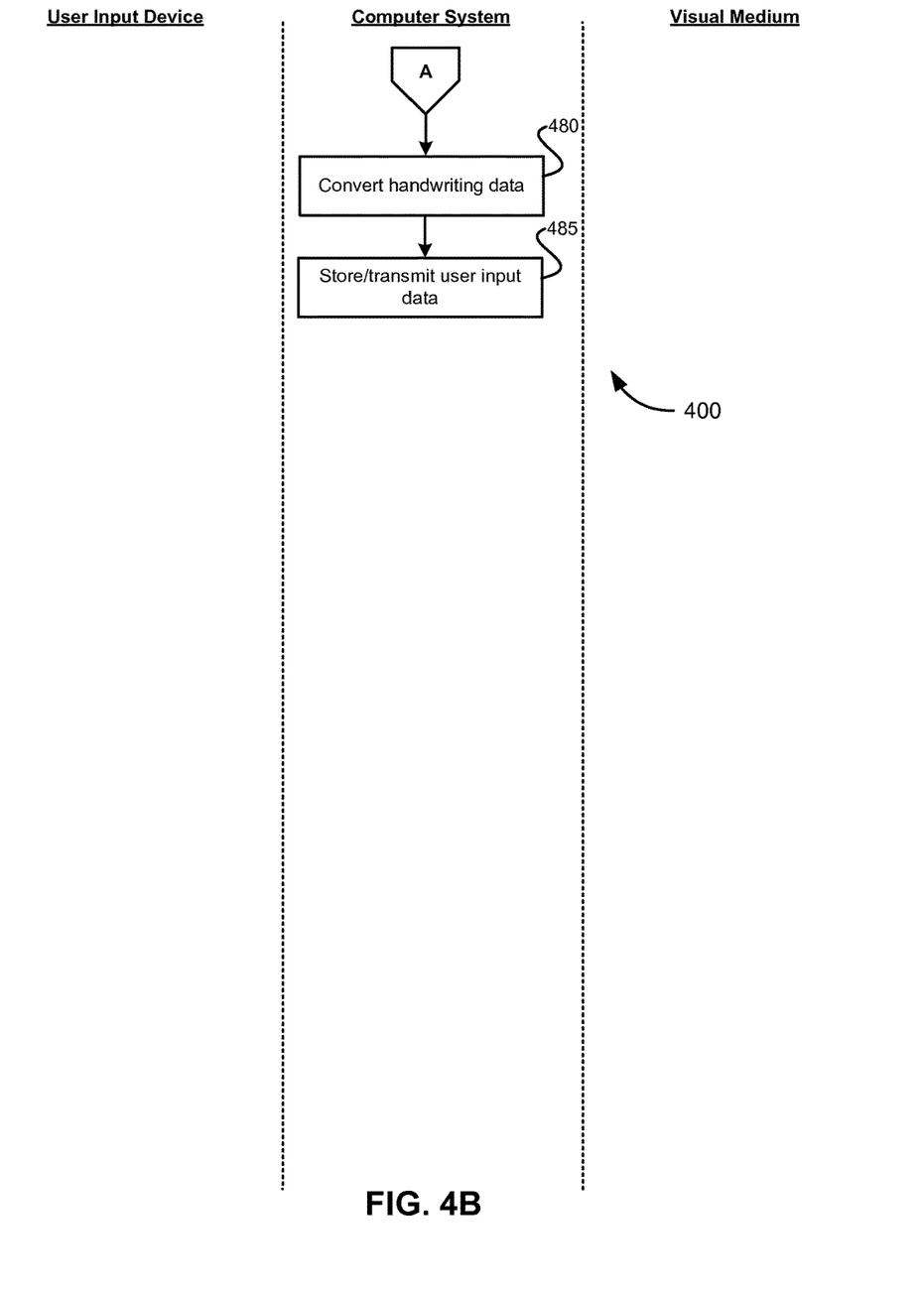

At block 445, the form selection may be received by the computer system. At block 450, if the visual medium is electronic, the computer system may transmit the form to the visual medium. This may involve transmitting an indicator of what form to display, or may involve transmitting a computer-readable file containing the form to the visual medium. At block 455, the form, be it in the form of an indicator or a file, may be received by the visual medium. At block 460, the selected form may be displayed by the visual medium. Of course, if the visual medium is a printed form, such as a form printed on paper, the steps of blocks 450, 455, and 460 do not occur.

At block 465, handwriting data may be received by the user input device and/or the visual medium as the user is writing his responses to the form on the visual medium. This handwriting data may be stored by the user input device and/or the visual medium until the user has completed the form. At block 470, some or all of the handwriting data may be transmitted to the computer system. As opposed to waiting until the user has completed the form before transmitting the handwriting data to the computer system, handwriting data may be transmitted continuously or periodically to the computer system while the user is handwriting his responses. Whether the handwriting data is transmitted continuously, periodically, or after the user has completed the form, the handwriting data may be received by the computer system at block 475.

At block 480, the handwriting data may be converted to editable text. This may involve a process such as optical character recognition and/or segmentation. Conversion of some or all of the handwriting data to electronically editable text may be desirable for the information provided by the user. For example, if the user provides an account number or address, this information may need to be entered into a database that uses electronic editable text. Some or all of the handwriting data may be converted to a file format such as a text file or MICROSOFT WORD document. In some embodiments, some or all of the handwriting data may be preserved in its handwritten form. For example, a signature of the user may not be converted to editable text or may be maintained in its original form and in editable text. While FIG. 4B shows the handwriting data as being converted by the computer system, in other embodiments the handwriting data may be converted to editable text by the user input device, visual medium, computer system (e.g., point of sale) and/or a host computer system.

At block 485, the user input data (which may be the same as the handwriting data, or may be handwriting data that has been completely or partially converted to editable text) may be stored by the computer system and/or transmitted to a host computer system. The biometric sample received at block 425 may be linked to the handwriting data.

Figure 5:
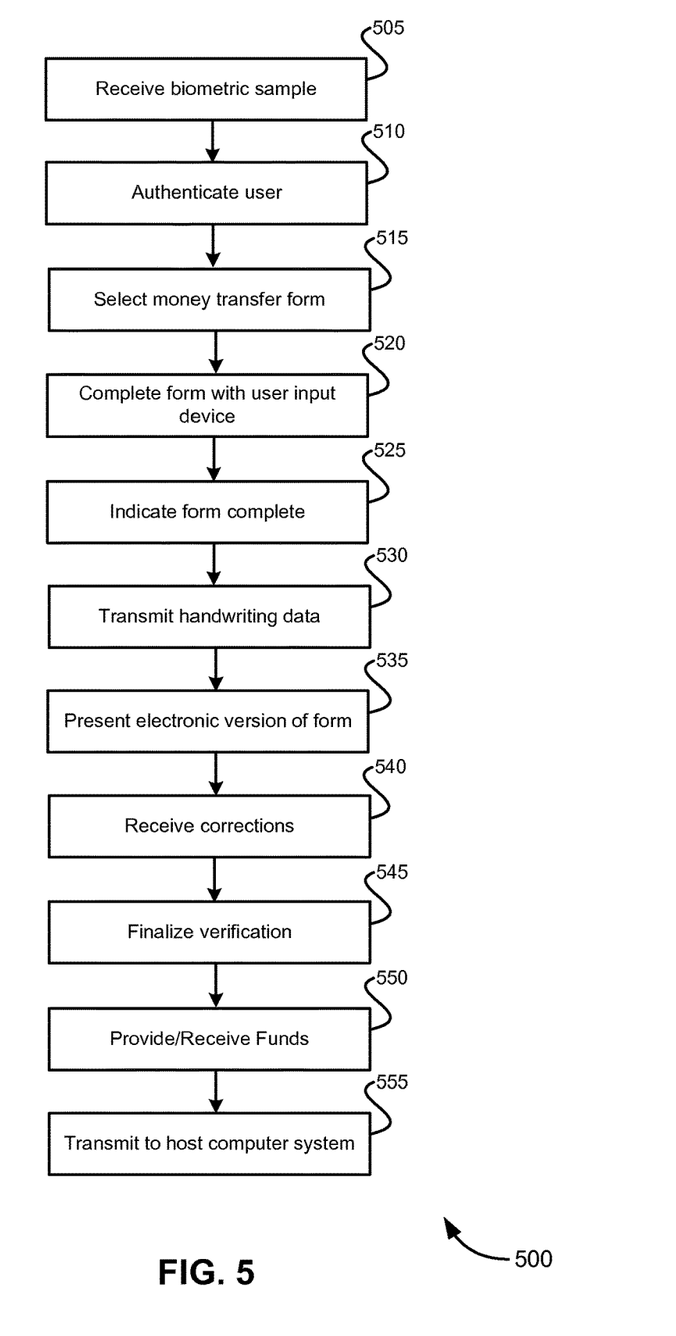
FIG. 5 illustrates a simplified method for using a user input device to conduct a money transfer transaction.

The use of such a method may be used for many types of forms and/or transactions. By way of example only, consider a money transfer transaction. FIG. 5 illustrates a simplified method 500 for using a user input device to conduct a money transfer transaction. For a money transfer transaction, the user may need to complete a form to initiate the money transfer at an agent location of a money transfer service provider, such as WESTERN UNION. Upon beginning the money transfer transaction, a user may be requested to provide a biometric sample using a user input device, such as those previously described. The user may provide such a biometric sample at block 505. This biometric sample may be transmitted to a computer system in communication with the user input device. The user's identity may be authenticated at block 510 by the computer system or some other computer system, such as a host computer system of the money transfer service provider, the computer system is in communication with and/or stored for future reference. Besides a money transfer transaction, others may be possible, such as healthcare transactions, prescriptions, passports, travel, citizenship applications, job applications, credit card applications, purchases of goods or services, etc.

At block 515, the user may then select a form necessary to initiate the money transfer transaction. The user may use the user input device to fill out the form at block 520. This form may be a printed paper form or electronic form (e.g., on a display screen, hologram, etc.). The user input device may or may not have ink and may be used similar to a conventional pen to complete the form. For a money transfer transaction, this may involve providing information such as a name of the payor, a name of the payee, an address, an amount (to be sent or received), a signature, a money transfer control number, a driver's license number, or other identification number, account number (such as where the transaction originated), etc. Once the user has completed the form using the user input device, at block 525, he may perform an action, such as pressing a button on the user input device or touching the user input device to a particular part of the form to signal the form has been filled out. At block 530, the handwriting data collected by the user input device may be transmitted to the computer system (or the handwriting data may have been at least partially transmitted to the computer system while the user was writing). Because the user's handwriting has been captured by the user input device and transmitted to the computer system, the printed paper form may be superfluous to the money transfer service provider. Therefore, the user may be allowed to retain the printed form as a record of his transaction.

After the form is completed, at block 535, the computer system, using an electronic display (e.g., and LCD screen, CRT screen, hologram, etc.), may present the user with an electronic version of the user's completed form. This version of the form may display some or all of the user's handwriting transcribed into editable electronic text. For example, names, addresses, amounts, and/or account numbers, etc. may be transcribed into editable text, while the user's signature remains in the user's handwriting. At block 540, the user may have the opportunity to correct any mistakes using the user input device or the computer system directly. The user may then provide a final verification at block 545 that the transaction information as displayed is correct (such a step may prevent errors from being introduced to the transaction during the conversion from handwriting to editable text) and that the money transfer is to be initiated. At block 550, the user may be prompted to provide the funds for the transaction (possibly cash or some other form of payment) to the computer system or to an agent (such as a cashier or clerk) acting on behalf of the money transfer service provider. At block 555, the information collected from the user may be transferred to a host computer system of the money transfer service provider.

In another exemplary embodiment, the user input device may be used with a computer system at a location different from an agent location of the money transfer service provider. Here, printed paper forms may not be available. Instead, the user may use the user input device to "write" on an electronic visual medium that displays the money transfer form necessary to complete the transaction desired by the user. Upon completing the form, if the user is to pay in cash, the user may be instructed to proceed to an agent location of the money transfer service provider. If the payment method is a form other than cash, such as from the user's bank account, credit card, debit card, stored value card, mobile wallet, etc., there may be no need for the user to travel to an agent location of the money transfer service provider. The biometric sample provided at the user input device may be compared to one gathered at the agent location or some other location (e.g., another business, government agency, etc.) to authenticate the user's identity. The agent of the money transfer service provider may also manually verify the user's identity, such as by inspecting an identification card. The user may then provide the cash to the agent of the money transfer service provider to initiate the money transfer transaction. The user may be presented with a printed version of the form as a receipt at the agent location.

Figure 6:
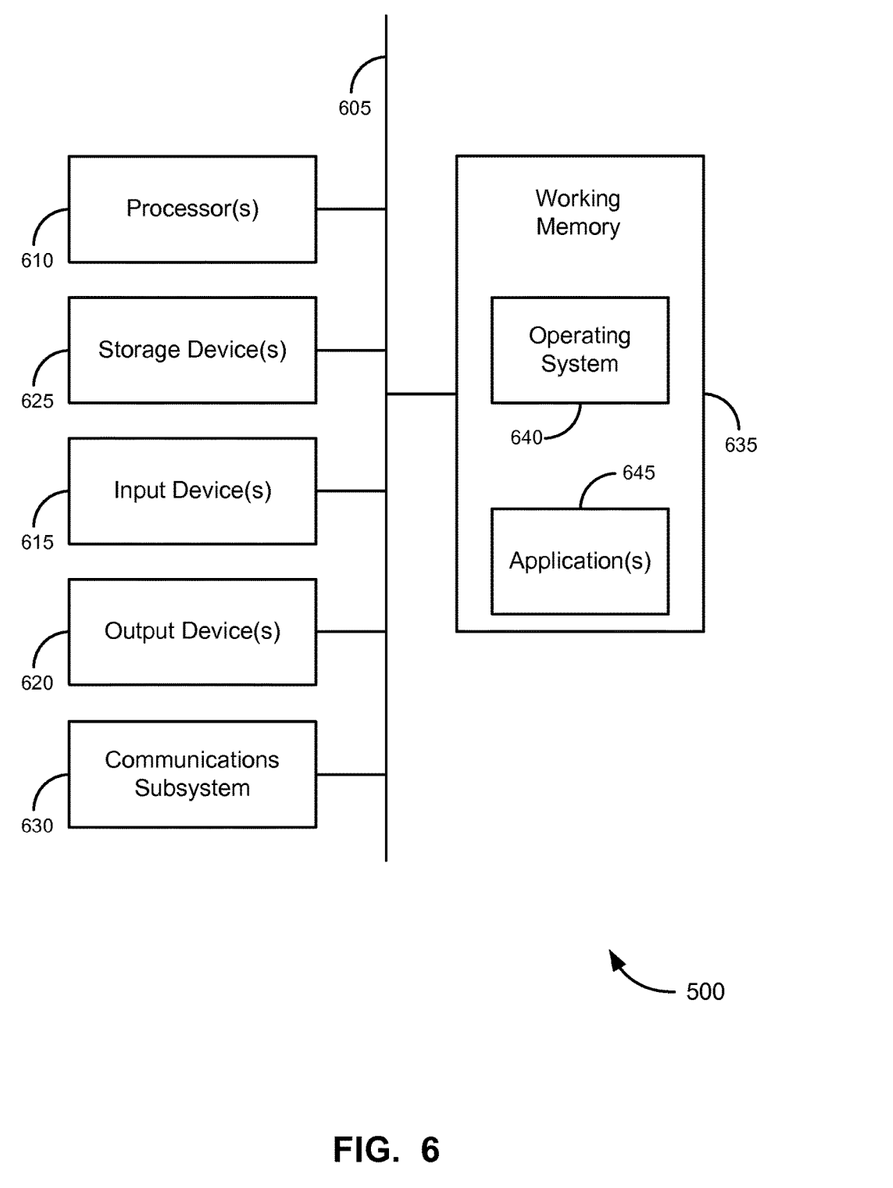
FIG. 6 illustrates a simplified block diagram of a computer system.

To perform the actions of the computer system and/or host computer system, or any of the other previously mentioned computing devices, a computer system as illustrated in FIG. 6 may be used. FIG. 6 provides a schematic illustration of one embodiment of a computer system 600 that can perform the methods provided by various other embodiments, as described herein, and/or can function as the host computer system, a remote kiosk/terminal, a point-of-sale device, a mobile device, and/or a computer system. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as the system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for collecting secured form data from a user via a user input device having a distal end and a proximate end, the method comprising:
    determining that the user has selected a form to be completed with the user input device, wherein the form comprises a physical writing medium projected onto a surface, the form having a plurality of fields for receiving information necessary to conduct a transaction, and wherein the user input device comprises an ink reservoir ink, and a tip, the ink being stored in the ink reservoir, and the tip configured to transfer ink to the physical writing medium, wherein the method comprises, prior to determining that the user has selected the form to be completed with the user input device:
        (a) providing the user with a plurality of transaction forms from which to select by projecting data identifying the plurality of transaction forms using a projector disposed on the user input device; and
        (b) receiving a selection of one of the plurality of transaction forms from the user;
    determining using one or more sensors of the user input device, that the user has selected a first region of the form for completion by using the tip to transfer ink to the first region of the physical writing medium;
    detecting, using the one or more sensors of the user input device, first user handwriting data provided in ink via the user input device, wherein the first user handwriting data represents information corresponding to the first region of the form;
    determining, using one or more sensors of the user input device, that the user has selected a second region of the form for completion by using the tip to transfer ink to the second region of the physical writing medium;
    detecting, using the one or more sensors of the user input device, second user handwriting data provided in ink via the user input device, wherein the second user handwriting data represents information corresponding to the second region of the form;
    converting, by the user input device, at least one of the first user handwriting data or the second user handwriting data into electronic text; and
    transmitting, at least a portion of the information corresponding to the first and second regions of the form to a computer system to conduct the transaction.

2. The method of claim 1, further comprising:
    prior to transmitting the information to the computer system:
        receiving, by the user input device, biometric data from the user; and
        authenticating the user based on the biometric data received from the user.

3. The method of claim 2, wherein the biometric data received from the user includes one or more of:
    a fingerprint received via a fingerprint scanner integrated into the user input device;
    a voiceprint received via a voiceprint recorder of the user input device; or
    a retinal image received via a retina scanner integrated into the user input device.

4. The method of claim 1, wherein the user input device includes a camera configured to collect the user handwriting data.

5. The method of claim 1, wherein converting at least one of the first user handwriting data or the second user handwriting data into electronic text comprises:
    determining a first content type associated with the first region of the form;
    determining whether or not to convert the first user handwriting data, based on the first content type;
    determining a second content type associated with the second region of the form; and
    determining whether or not to convert the second user handwriting data, based on the second content type.

6. The method of claim 5, wherein the determined first content type associated with the first region of the form comprises at least one of user signature content type or a biometric authentication content type, and wherein converting at least one of the first user handwriting data or the second user handwriting data into electronic text comprises determining that the first user handwriting data in the first region of the form is not to be converted, based on the determined first content type.

7. A user input device having a distal end and a proximate end, comprising:
    one or more network interfaces;
    one or more processors; and
    memory communicatively coupled with and readable by the one or more processors and having stored therein processor-readable instructions which, when executed by the one or more processors, cause the user input device to:
        determine that a user has selected a form to be completed with the user input device, wherein the form comprises an electronic representation of a form on a display device, the form having a plurality of fields for receiving information necessary to conduct a transaction, wherein the instructions further cause the user input device to, prior to determining that the user has selected the form to be completed with the user input device:
            (a) provide the user with a plurality of transaction forms from which to select by projecting data identifying the plurality of transaction forms using a projector disposed on the user input device; and (b) receive a selection of one of the plurality of transaction forms from the user;

determine, using one or more sensors of the user input device, that the user has selected a first region of the form for completion by identifying a first location selected by the user input device in the first region on the display device;

detect, using one or more sensors of the user input device, first user handwriting data provided via the user input device, wherein the first user handwriting data represents information corresponding to the first region of the form;

determine, using one or more sensors of the user input device that the user has selected a second region of the form for completion by identifying a second location selected by the user input device in the second region on the display device;

detect using the one or more sensors of the user input device, second user handwriting data provided via the user input device, wherein the second user handwriting data represents information corresponding to the second region of the form;

convert at least one of the first user handwriting data or the second user handwriting data into electronic text; and transmit, to a computer system via a network interface, at least a portion of the information corresponding to the first and second regions of the form to conduct the transaction.

8. The user input device of claim 7, further comprising a biometric authentication device configured to:
receive biometric data from the user; and
authenticate the user based on the biometric data.

9. The user input device of claim 8, the memory having stored therein additional processor-readable instructions which, when executed by the one or more processors, cause the user input device to:
link the biometric data received from the user to at least the portion of the information corresponding to the first and second regions of the form transmitted to the computer system.

10. The user input device of claim 8, wherein the biometric authentication device includes one or more of fingerprint scanner, a voiceprint recorder, or a retina scanner, and wherein the biometric data received from the user includes one or more of:
a fingerprint received via the fingerprint scanner;
a voiceprint received via the voiceprint recorder; or
a retinal image received via the retina scanner.

11. The user input device of claim 7, further comprising an ink reservoir, ink, and a tip, the ink being stored in the ink reservoir, and the tip configured to transfer ink to a visual medium.

12. The user input device of claim 7, further comprising a camera configured to collect the user handwriting data.

13. The user input device of claim 12, wherein the handwriting comprises a signature, and wherein the user input device is further configured to:
transmit, to a host computer system, the signature as an authorization for the transaction.

14. The user input device of claim 7, the memory having stored therein additional processor-readable instructions which, when executed by the one or more processors, cause the user input device to:
use a projector integrated into the user input device to display the electronic text to the user; and
receive corrections to the electronic text from the user.

15. The user input device of claim 7, further comprising a handwriting sensor including a camera configured to capture images of the user input device in proximity with the display device.

16. The user input device of claim 7, further comprising a touch screen display, the memory having stored therein additional processor-readable instructions which, when executed by the one or more processors, cause the user input device to:
determine that a first indication has been received based on a detection by the touch screen display that the user input device has contacted the first region of the form;
determine that a second indication has been received based on a detection by the touch screen display that the user input device has contacted the second region of the form; and
using the touch screen display to capture the first user handwriting data and the second user handwriting data.

17. The user input device of claim 7, wherein converting at least one of the first user handwriting data or the second user handwriting data into electronic text comprises:
determining a first content type associated with the first region of the form;
determining whether or not to convert the first user handwriting data, based on the first content type;
determining a second content type associated with the second region of the form; and
determining whether or not to convert the second user handwriting data, based on the second content type.

18. The user input device of claim 17, wherein the determined first content type associated with the first region of the form comprises at least one of user signature content type or a biometric authentication content type, and wherein converting at least one of the first user handwriting data or the second user handwriting data into electronic text comprises determining that the first user handwriting data in the first region of the form is not to be converted, based on the determined first content type.

* * * * *